United States Patent [19]

Sherman

[11] Patent Number: 5,037,240

[45] Date of Patent: Aug. 6, 1991

[54] IN-SITU SOIL TREATMENT PROCESS

[75] Inventor: Lynn D. Sherman, Perrysburg, Ohio

[73] Assignee: Ocean Toad Enterprises Inc., Perrysburg, Ohio

[21] Appl. No.: 554,443

[22] Filed: Jul. 19, 1990

[51] Int. Cl.[5] ............................................. B09B 1/00
[52] U.S. Cl. ..................................... 405/128; 405/50; 405/263
[58] Field of Search ................ 405/128, 129, 43, 45, 405/258, 36, 50, 263; 52/169.5

[56] References Cited

U.S. PATENT DOCUMENTS

| | | | |
|---|---|---|---|
| 2,577,252 | 12/1951 | Kjellman | 405/45 |
| 4,401,569 | 8/1983 | Jhaveri et al. | 405/128 X |
| 4,484,835 | 11/1984 | Van Klinken | 405/258 X |
| 4,622,138 | 11/1986 | Wager | 405/45 |
| 4,687,372 | 8/1987 | Thornton | 405/128 |
| 4,765,902 | 8/1988 | Ely et al. | 405/128 X |
| 4,850,745 | 7/1989 | Hater et al. | 405/128 X |
| 4,945,988 | 8/1990 | Payne et al. | 405/128 X |

FOREIGN PATENT DOCUMENTS

| | | | |
|---|---|---|---|
| 3601490 | 7/1987 | Fed. Rep. of Germany | 405/128 |
| 3729653 | 3/1989 | Fed. Rep. of Germany | 405/128 |

Primary Examiner—Dennis L. Taylor
Attorney, Agent, or Firm—Michael Sand Co.

[57] ABSTRACT

The present invention relates to the method of 'in situ' collection and treatment of floating, sinking and dissolved contaminants in a soil environment which involves installation of wick-like drains in at least a portion of the waste site on the down-gradient side of in-ground water flow. The method more particularly involves the installation of pre-fabricated drainage strips in the form of wick drains which are installed vertically or inclinedly into the normal water table of the contaminated waste site. The depth of the wick drains which include porous and/or slotted channels are installed as deeply into the waste site as the normal in-ground water flow of the pollutants which affects its travel into the lower adjacent aquifer.

In accordance with this invention, some of the wick drains which include porous or slotted pipes are employed for the injection of treating chemicals or reagents into the contaminated soil for its treatment in place prior to its normal flow into the aquifer. Some of the drains may be employed for injection of bacteria or microbes, nutrients and/or air into the waste site to obtain underground treatment of the pollutants in place over relatively short or longer periods of time depending upon the extent, chemical nature and concentration of pollutants. The wick drains are preferably comprised of highly-flexible lengthy plastic extrusion, most desirably comprised of polypropylene or similar plastic materials, having maximum water flow capacity along grooves formed longitudinally on both sides of the core. The drain has a woven filter-like jacket on its exterior which is comprised of a strong durable non-woven plastic geo-textile. The jacket serves as a filter to allow passage of ground water into the drain core, while preventing plugging of the filter form the adjacent oil or pluggage of the drain, the jacket serves as an outer skin to maintain cross-sectional shape and hydraulic capacity of the core channels.

19 Claims, 3 Drawing Sheets

IN-SITU SOIL TREATMENT PROCESS

BACKGROUND OF THE INVENTION

Contaminated water is generated by a wide variety of diverse processes which generally include rain from stormy weather contacting raw wastes or by ground water flowing through contaminated soil at uncontrolled waste sites. Normally, the occurrence of such polluted water requires treatment to render the pollutants harmless or to remove the pollutants prior to release of the water back into the environment. Previously, this has been accomplished by transporting the contaminated water offsite to a commercial treatment facility or treating onsite using mobile treatment apparatus. Onsite treatment provides several important advantages when compared with offsite treatment. Onsite cleanup of contaminated water eliminates the significant cost of waste water transportation. Treatment onsite can be initiated by direct and timely treatment of the contaminated water or by a mobile treatment plant. Direct control over treatment and disposal of waste water by-products is maintained when processing is handled onsite. The subject invention relates to 'in situ' treatment of contaminated soil environments which expedite treatment of contaminants without costly soil removal or contaminated water transport from the site.

TECHNICAL FIELD

Recent technical developments in treatment of contaminated soils and the associated aquifers have shifted the emphasis of remedial actions from one of treating water to source reduction. It has been found that few ground water remedial actions have been successful without removal or significant reduction in the source of the contamination. It has been found in a recent study completed by the U.S. General Accounting Office that standard treatment of contaminated ground water including pumping from the site does not permanently meet the regulatory standards for clean-up of contaminated soil. Whenever the original static ground water level returns to normal, the ground water, in most instances, is found to be contaminated. The primary reason for this occurrence is that the great majority of the spilled or released chemical remains in the soils attached to individual soil particles. When water passes through such soil a portion of the chemical separates into the water and then enters the aquifer. Only when this source is removed, will contamination of the aquifer be eliminated.

BACKGROUND INFORMATION

Mobile water treatment plants can be used on virtually any jobsite involving treatment of contaminated water. Such plants are capable of treating a wide variety of pollutants often found in water at uncontrolled waste sites. The mobile treatment plant may utilize a wide variety of chemical agents. Also air stripping columns capable of removing volatile compounds such as methylene chloride, gasoline, or benzene can be utilized in such systems. Such treatment plants can be employed on nearly any site where polluted waters present a significant problem. However, the contaminated water must be extracted from the soil such as by pumping and processed by the plant located above ground adjacent the jobsite.

Previously, watertight screens or panels have been employed in the ground to surround contaminated soil environments or waste dumps. One type of such apparatus has been disclosed in U.S. Pat. No. 4,664,560 issued May 12, 1987 which utilizes male and female interlocking plastic sections or profiles which are lengthy and sufficiently flexible to provide completely surrounding enclosures around waste sites to permit extraction of contaminated water. Such apparatus provides a subsurface watertight barrier surrounding the contaminated area and is installed into a clay or similar geologic barrier that exists under the contaminated area to prevent migration of ground water to isolate material on one side of the barrier from release to the surrounding environment. Thus, such apparatus provides a subsurface watertight barrier to prevent migration of ground water to isolate material on one side of the barrier from material on the other side. Such barriers are costly to install and require virtually complete enclosure of the source of contaminated water and its removal to above-ground locations for treatment.

The watertight barrier is designed as an 'in situ' containment device which serves as a treatment vessel. This 'in situ' tank can be designed to keep all contaminants and treatment agents within a confined space. The barrier can also be installed such that the water in the 'in situ' tank can be raised and lowered to perform soil washing or reverse leaching. Water levels are adjusted by allowing the natural water gradient to pass under the barrier and travel up inside the soil tank until static conditions are established. The barrier is essentially designed for complete enclosure of the waste site for treatment of the contaminants contained therein.

Specialized bacteria have been used in the past to degrade organic contamination in activated sludge systems and in land treatment facilities. Ground water pump and treat schemes have repeatedly been recommended to remediate contaminated aquifers. This has been proven to be the most cost effective means of removing organic contaminants and as in all biological systems, the concentration over which treatment is effective is quite wide. As the concentration of the contaminant in the aquifer diminishes with removal and treatment, there is an increased amount of clean off-site water that enters the recovery wells and subsequently passes through the treatment system reducing treatment removal rates and increasing the cost per gallon for treatment of the water. Frequently at a particular point, there is a need to replace biological treatment with more expensive hand or chemical technologies which have necessitated the need for 'in situ' treatment to be more effective.

In a related area, when constructing works such as road embankments, bridge approaches, dikes, or buildings on compressible soils, significant settlements may occur due to consolidation of the soils under the superimposed loads. To avoid serious and expensive problems due to such settlements, it is desirable to cause this consolidation to occur at the outset of the project and in the shortest possible time, preferably during the construction period. Consolidation of compressible soils involves removal of pore water from the soil. This is traditionally accomplished by applying a surcharge or preload to the construction area to essentially squeeze the water out. Unfortunately, compressible soils are also often low-permeability soils such as peats, silts, clays, and the like, and as such, the water is not easily squeezed out.

To facilitate the dewatering process, it is necessary to install vertical drains into the soil to provide a conduit for the water flow. Traditionally these drains have taken the form of sand columns which are holes drilled into the low-permeability soil and filled with higher-permeability sand. However, such drains are relatively expensive and inconvenient to place in required close spacing. Plastic tubular elements, so called wick drains, have been utilized as a replacement for sand drains. Wicks are relatively inexpensive, and provide higher water conductivity and can be easily installed in close spacing, thereby shortening the flow path of the water in the low-permeability soils and thus expediting the consolidation process.

SUMMARY OF THE INVENTION

The present invention relates to the method of 'in situ' collection and treatment of floating, sinking and dissolved contaminants in a soil environment which involves installation of wick-like drains in at least a portion of the waste site on the down-gradient side of in-ground water flow. The method more particularly involves the installation of pre-fabricated drainage strips in the form of wick drains or porous pipe which are installed vertically or inclinedly into the normal water table of the contaminated waste site. The depth of the wick drains which include essentially porous and/or slotted channels are installed as deeply into the waste site as the normal in-ground water flow of the pollutants which affects its travel into the lower adjacent aquifer.

In accordance with this invention, some of the wick drains which include a plurality of porous or slotted pipes, or individual porous or slotted pipes, can be employed for the injection of treating chemicals or reagents into the contaminated soil for its treatment in place prior to its normal flow into the aquifer. Some of the drains may be employed for injection of bacteria or microbes, nutrients and/or air into the waste site to obtain underground treatment of the pollutants in place over relatively short or longer periods of time depending upon the extent, chemical nature and concentration of pollutants. The wick drains are preferably comprised of highly-flexible lengthy plastic extrusions, most desirably comprised of polypropylene or similar plastic materials, having maximum water flow capacity along channels formed longitudinally on both sides of the core. The drain has a woven filter-like jacket on its exterior which is comprised of a strong durable non-woven plastic geo-textile. The jacket serves as a filter to allow passage of ground water into the drain core, while preventing plugging of the filter from the adjacent soil or pluggage of the drain, the jacket serving as an outer skin to maintain cross-sectional shape and hydraulic capacity of the core channels. The method is employed to treat the contaminants in place in relatively deep reservoirs formed within the waste site or their removal to above-ground processing and elimination operations. The subject method permits anaerobic and aerobic treatment of the contaminants within in-ground reservoirs or sumps where the contaminants are collected and treated such as by bacterial growth by most efficient and economical forms of treatment at and within the waste site.

The subject method may be practiced without obstructing the free-flow of ground water or surface water into or out of the waste site area. Ring-type organic compounds or other organic contaminants which require anaerobic degradation for one or more stages of degradation can be converted into environmentally safe and non-toxic condition within the waste site. The method may also be employed to treat contaminated soil conditions beneath leaky tanks whether located above or below ground level for treating contaminants in the immediate area beneath such tank or tanks. The process is applicable to both short-term and long-term treatment of contaminated soil environments by low-cost and most efficient procedures.

BRIEF DESCRIPTION OF THE DRAWINGS

Several preferred embodiments of the invention, illustrative of the best mode in which the applicant has contemplated applying its principles, are set forth in the following description and shown in the drawings and are particularly and distinctly pointed and set forth in the appended claims.

Similar numerals refer to similar parts throughout the drawings.

DESCRIPTION OF THE PREFERRED EMBODIMENTS

The present invention relates to a method of 'in situ' collection and treatment of floating, sinking and dissolved contaminants in a soil environment which involves the installation of wick-like drains down-stream of the waste site. A plurality of the drains is normally installed either vertically or inclinedly in the form of so-called wick drains extending into the normal water table of the contaminated waste site. The wick drains may be comprised of either porous or slotted pipes installed as deeply into the waste site as the normal in-ground water flow of pollutants which affects its travel into the lower adjacent aquifer.

Figure 1:
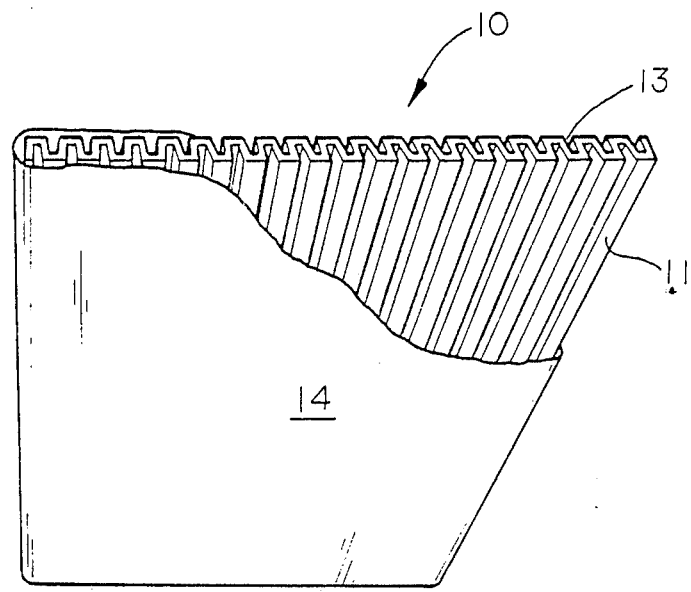
FIG. 1 is a schematic perspective view of a wick drain element for positioning within a waste site adapted to emitting or treating contaminated water.

As shown in FIG. 1, the wick drains 10 are comprised of pre-fabricated drainage strips, the core 11 having a highly flexible length such as a polypropylene extrusion having maximum water flow capacity along grooves 13 formed longitudinally on both sides of the core. The extrusion is formed having uniform dimensions and flow channels on both sides of the core 11, the extrusion being formed with strict quality control to provide a series of similar channels on both sides of the core. The core is surrounded by a porous jacket 14 of strong, durable non-woven textile such as polypropylene having a permeability of about $4.5 \times 10^{-2}$ centimeters per second. The jacket serves as a filter to allow passage of ground water into the plurality of channels on opposite sides of the drain core while preventing piping of fines into the core from adjacent soils. The jacket also serves as an outer covering or skin to maintain the cross-sectional shape and hydraulic capacity of the core channels.

One preferred form of the wick drain material is shown in FIG. 1 and is formed in accordance with the following specifications:

| ITEM | UNITS | VALUE |
| --- | --- | --- |
| Drain Body | | 100% Polypropylene |
| Filter Jacket | | 100% Polypropylene |
| Weight (inc. filter jacket) | gm/m | 93 |
| Width (inc. filter jacket) | mm | 100 |
| Thickness (inc. filter jacket) | mm | 3 |
| Water Discharge Capacity | m$^3$/sec | $1.2 \times 10^{-5}$ |
| Water Permeability (k) | m/sec | $6.5 \times 10^{-4}$ |
| Free Volume | mm$^3$/mm | 180 |
| Tensile Strength (Filter) | kn | 1.3 |

Various sizes of the specified wick drain product may be installed within the waste site, the drains being free of defects, rips, holes or flaws. The drain is normally protected from any adverse conditions or dirt while stored above-ground prior to its installation underground.

Figure 2:
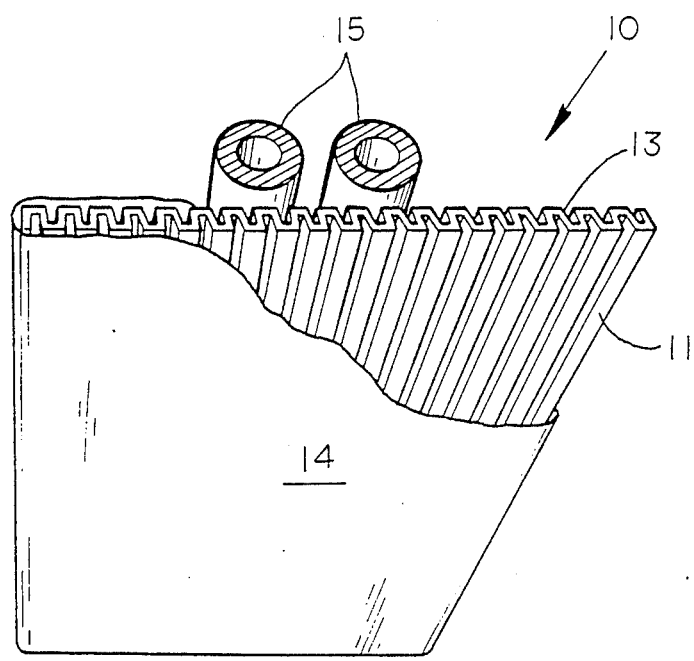
FIG. 2 is a schematic perspective view similar to FIG. 1 showing a wick drain and associated tubular members in vertical relation.
Figure 3:
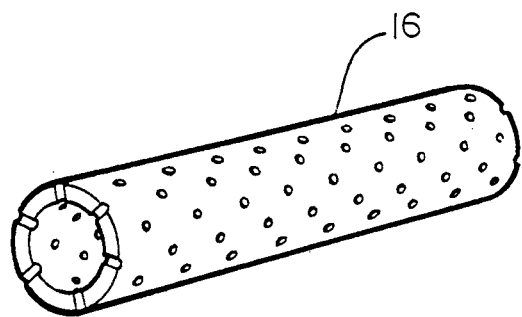
FIG. 3 is a schematic perspective view of a porous pipe used alone or in conjunction with a wick drain.
Figure 4:
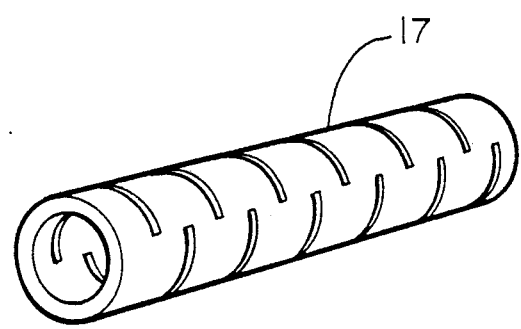
FIG. 4 is a view similar to FIG. 3 of a slotted pipe or tubing used alone or in conjunction with a wick drain.

As shown in FIG. 2, the wick drains 10 may also incorporate one or more tubular members 15 such as porous or slotted flexible plastic pipe between the core 11 and the outer jacket 14 as desired for treating various waste site conditions. One type of such porous pipe which is preferred for use with the wick drain core is the porous pipe product of Precision Porous Pipe, Inc. of Mckenzie, Tenn. Such pipe or tubing is extruded from pre-vulcanized shredded and ground old tire rubber and high-density polyethylene which is formed in accordance with U.S. patent application Ser. No. 07/346,637 filed May 3, 1989, entitled "Process for Making Uniform Porosity Flexible Irrigation Pipe" "now U.S. Pat. No. 4,958,770" issued Sept. 25, 1990. FIG. 3 shows one form of porous pipe 16 having uniform porosity and FIG. 4 shows one form of slotted pipe 17 also having uniform porosity.

Vertical or inclined drains 10, such as shown in FIG. 2, are preferably installed in the waste site in such manner to cause a minimum of disturbance of the sand or top blanket, or sub-soil, during the installation. The pre-fabricated drains are normally installed using a mandrel or sleeve which is capable of advancing the drain through compressible soils to the required depth using vibratory, constant-load or constant-rate of advancement methods. Use of falling-weight impact hammers is not permitted to avoid damage to the drains. Also, jetting is not normally permitted for installation. The protective mandrel serves to safe-guard the pre-fabricated drain material from tears, cuts and abrasions during installation and is withdrawn after installation of the drain. The drain is preferably provided with an anchor plate or rod at the bottom to anchor the drain at the required depth at the time of mandrel removal. The projected cross-sectional area of the mandrel and anchor combination is preferably not greater than about 24 square inches. One type of such installation apparatus is disclosed in U.S. Pat. No. 4,664,560 issued May 12, 1987.

The wick drains 10 may be used alone or in combination with the porous or slotted pipe 16 and 17 depending on the type of treatment to be applied to the particular area of the waste site. In addition, the porous or slotted pipes may also be used alone or in combination depending upon the treatment and particular soil conditions. The porous pipe 16 shown in FIG. 3 may be used singly or combinedly with the wick drain or drains 10 to cover the horizontal surface more completely with either uniform or staggered spacing. The slotted tubing or pipe 17 shown in FIG. 4 may be similarly used, for vertical or inclined installation. This type of tubing or pipe is used in geologic formations that require specific placement of bacteria, air and/or nutrients for desired sub-surface reactions. Where the pipes or tubes are employed in pairs as shown in FIG. 2, various reactants can be delivered into the soil by the individual passageways. Or alternately, one pipe can be employed for inflowing reactants and the other for withdrawal of reacted soil contaminants.

The particular installation of the vertical drains is carefully laid out in plans and treatment programs for the particular work site and normally the drains are not permitted to deviate from such plans by more than about 6 inches and are carefully protected against damage or improper installation. The plans and treatment programs outline the particular number of drains to be installed and their elevations with proper instrumentation for determining the drain depths at any time. Splices or connections to the vertical drain material may be accomplished with particular care to insure continuity of the wick material throughout its vertical depth. The drains are terminated at the surface so that at least short lengths of ½ to 1 foot lengths protrude above the working surface at each pre-fabricated drain location. Care must be exercised in installing a prescribed pattern of plurality of drains so that an adequate treatment area is provided on the down-stream side of in-ground water flow to permit gathering the contaminants in reservoirs, wells or sumps for their pumping to the surface or treatment in place below-ground.

Figure 5:
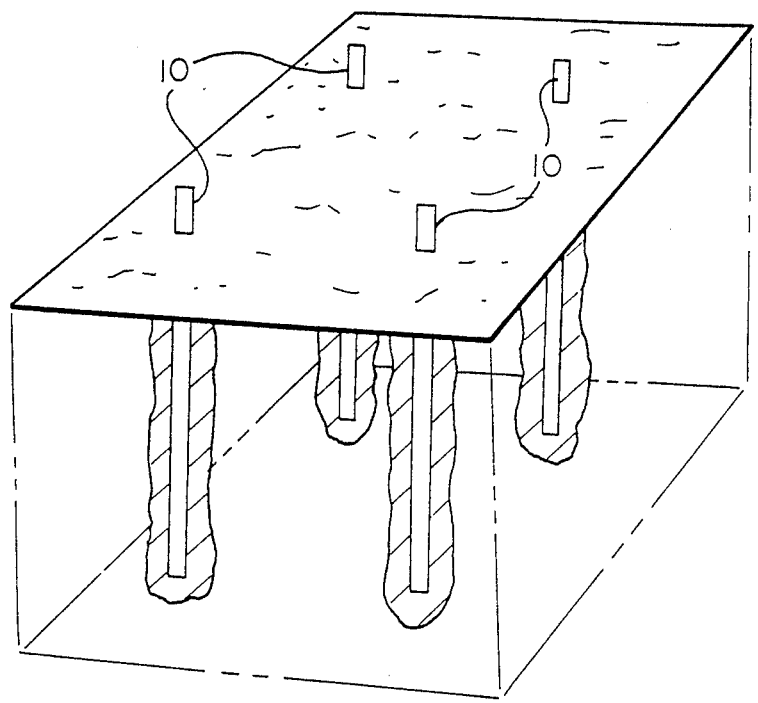
FIG. 5 is a view similar to FIG. 2 showing the initial introduction of reagents into the waste site through wick drain elements.
Figure 6:
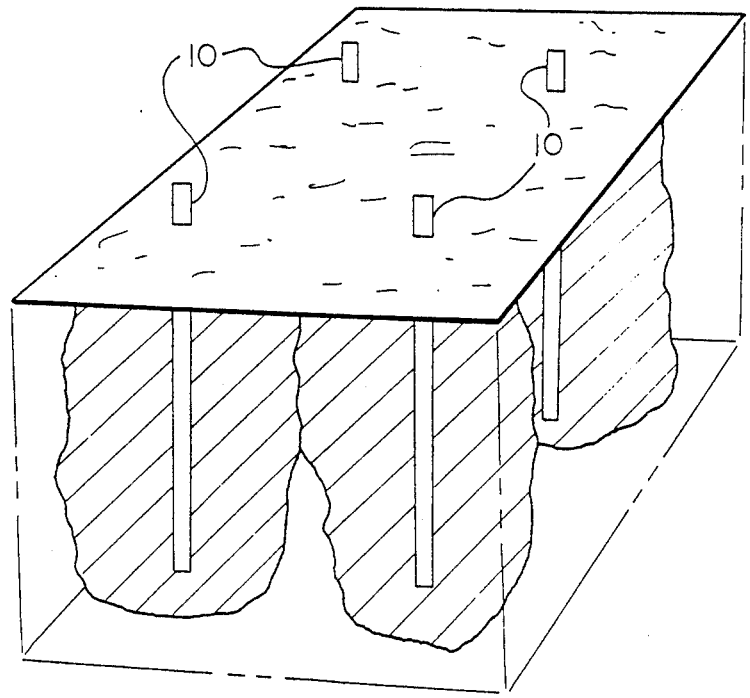
FIG. 6 is a view similar to FIG. 5 showing a later phase of treatment procedure.

As shown in FIG. 5, the wick drains 10 can be installed at a uniform spacing which will allow bacteria to enter all of the adjacent soil pores. The drains may also be used to deliver nutrients and oxygen to the soil matrix along with bacteria and microbes to effect biological growth within the waste site. By using this system it is possible to treat soils 'in situ' without the additional cost of excavating soils and placing these soils above-ground for treatment. FIG. 6 shows how the reactants travel outwardly radially from the drains 10 by capillary action to react with the contaminants in place for their neutralization or conversion into non-toxic form. It appears that the prescribed treatment procedures would not require a Resource Conservation and Recovery Act permit and the method can be practiced in keeping with existing land disposal restriction regulations and interpretation of these regulations.

The wick drains may be installed at an extremely close spacing configuration and do not require sophisticated installation equipment. With minor modifications, existing track excavators can be used to install the wick drains. For example, two tubes as shown in FIG. 2 of the drawings can be perforated throughout the length of the product and can have variable perforations such that either diffused air or liquids added to the wick can be equally applied to the soil column. The tubes may also consist of uniform porosity flexible rubber pipe or tubing made from pre-vulcanized elastomer from old tire rubber and high-density polyethylene as disclosed in the referenced patent application. The tubes are preferably installed within the wick jacket for either ingress of chemical or biological reagents or egress of contaminated water and/or pollutants. A determination of which wick configuration best meets the needs of the site is based on the actual geologic features of a given waste site.

The wick drain sizes are varied or modified for different soil types and for different soil permeabilities. The goal of such wick application is to create a soil structure such that oxygen is allowed to enter all of the soil pores at a rate that is sufficient for aerobic bacterial growth and to allow the introduction and proliferation of bacterial species that preferentially out-compete the existing bacterial population.

The wick drains can be installed to any desired depth or angle and specialized bacteria or fungi can be applied to the soil using the drains. The wick provides a means of introducing nutrients, compressed air, oxygen, hydrogen-peroxide or other forms of oxidizers into the soil profile at the desired depth. The change of the soil profile from an anaerobic environment to an aerobic environment permits the bio-treatment of soils to any desired depth and does not require that any soil be removed for on-site above-ground treatment or off-site disposal. Thus, significant cost savings from reducing the material handing requirements are readily obtained. The wickdrains are also used to facilitate soil washing by using it to distribute properly selected chemicals designed to leach metal and other contaminants from the soil matrix. The leaching solution can be collected from the drain from recovery wells located at the desired level within the soil environment or be recovery wells located in the under-lying permeable formation minimizing the potential for off-site migration.

The subject wick drains and methods of their use are especially applicable to waste sites where 'in situ' remediation of soil contaminated with organic constituents is required. The passage of revised environmental regulation has caused a serious increase need to remove or reduce virtually all sources of contamination.

Soil Washing Chemicals

Anionic, cationic, and non-ionic surfactants which are emulsion forming compounds that break the surface tension between non-polar organic compounds and polar water molecules may be used.

Chelating Agents—ethylene diamine tetraacetic (EDTA), cyclohexylene diamine tetraacetic (CDTA), and other similar agents are added to bind and free the movement of particular metals ions in a solution for later extraction and removal. EDTA works best with divalent (2 charges) ions such as copper and CDTA works best with trivalent (3 charges) ions such as aluminum, ferric iron, etc.

Steam and Hot Water—This will act to mobilize those chemicals that are not in liquid form at the ambient soil temperatures. This same procedure is now being used in the oil fields of Texas to increase production from oil fields which have reduced production.

Acid washing—dilute acid solutions of hydrochloric, phosphoric, nitric, acetic, and sulfuric acids to name a few can be used to mobilize metal movement in the soils for recovery, or can be used to break emulsions in-situ and allow collection of free floating product.

Chemicals that React in-situ

Ferrous sulfate is used to combine and make non-reactive free cyanide ions in solutions. Hydrogen peroxide, in the presence of a copper catalyst will oxidize phenol to carbon dioxide and water. Sodium hypochlorite in a basic solution will oxidize the cyanide ion to carbon dioxide and nitrogen gas.

Standard Biological Conditions for Aerobic Degradation

Oxygen requirements in activated sludge require a minimum of 1.0 mg/liter dissolved oxygen with a recommended range of 2.0 mg/liter. Any excess oxygen does not necessarily speed the process.

The recommended nutrient conditions for bacterial growth are a carbon to nitrogen ratio of 10:1 in the cells and a metabolic ration of 16.7 carbon atoms metabolized to 1 nitrogen atom or 16.7:1 C:N ratio. The nitrogen:phosphorus ratio is in the 5:1 to 11:1 range and can be higher to exclude toxic effects of some metals such as lead.

Naturally-occurring soil bacteria may be enhanced to speed degradation of specially formulated bacterial mixes and can be used to attack specific problem chemicals in the soil. These specially-formulated bacteria may require continuous or frequent re-inoculation to keep an adequate number of organisms present in the soil to perform the necessary biodegradation.

Pseudomonas has been identified as effectively degrading phenols, benzene, toluene, ethyl benzene, fluorobenzene, chlorotoluene, naphthalene, and creosols. Norcadia has been identified as effectively degrading aliphatic acids, kerosene, jet fuel, paraffin wax, and detergents. Bacillus has been identified as effectively degrading hydrocarbons, oils and greases, pesticides, polymerized olefinic hydrocarbons, and latex.

The foregoing is a sampling of the literature on microbial degradation reactants and does not represent an exhaustive search or survey of all of the possible organisms or compounds that have demonstrated bio-degradation potential.

Examples of promoting anaerobic and aerobic bacterial growth and conversion to non-toxic by-products As depth increases, the oxygen content of the soil is severely reduced. Aerating the soil with wick drains will temporarily change this condition and allow aerobic treatment. If it is determined that anaerobic degradation is required, the soil aeration can be discontinued and as the available oxygen is utilized, anaerobic conditions will recur. To speed this process the soil can be saturated with water and a vacuum may be applied to degas the soils. Specially produced facutative anaerobic bacteria may be supplemented in the bacterial cultures applied to increase the available population of naturally-occurring facutative anaerobic organisms.

Generic classes of chemicals or reactants which are used to treat most common contaminants.

The majority of installations will use a bacterial culture prepared by supply houses for the chemicals of interest. The chemicals used will be fertilized (phosphorus, nitrogen (ammonia) and trace metals) to promote cell growth. And the last ingredient will be the application of oxygen through either a solution of hydrogen peroxide or compressed air, for example.

The regulations under the Superfund Accounting and Recovery Act required that all under-ground storage tanks be upgraded or removed based on a specific schedule. As such tanks have been removed, there has been a substantial increase in the total number of sites where extensive contamination of the under-lying soils has occurred. In many cases, the tank area has been excavated to a maximum depth possible by excavation equipment and in many cases building foundations or adjacent structural stability have required that excavation be halted to avoid endangering such structures.

For those leaking tanks or contaminated soils which have not affected ground water and which have physical constraints for further excavation (due to possible failure of building foundations), until the advent of this invention there have been no remedial solutions for 'in situ' treatment of waste sites. The subject wick drain offers an 'in situ' means for bio-remediating these situations. The ease of installation in even the tightest locations or under existing structures makes the subject wick drains and methods of use the most versatile of remedial technologies presently existing.

As stated supra, the basic method involves treating the contaminants in a soil environment by either injecting the chemical and/or bacterial reagents into the waste site to the optimum depths for bio-remediation or chemical remediation of the contaminants and either treating the contaminants in place under-ground or pumping the same from collection points or wells for above-ground treatment. Obviously, the 'in situ' treatment is most expeditious and efficient depending upon the particular nature of the contaminants. Soil washing chemicals may be injected to effect soil washing and leaching action as well as introducing selected bacteria nutrients and air to effect biological growth for degradation of the contaminants and their conversion into non-toxic environmentally-safe condition.

The method may also employ a plurality of porous pipes or tubes arranged in series or parallel to inject or pump water saturated with gas and containing gas bubbles such as oxygen, carbon dioxide, and other suitable gases selected for their remedial properties. By passing such gases down the tubing and discharging it continuously or intermittently, such as through porous pipes having uniform porosity, the solubility and gas transfer process is enhanced due to the increased pressure in depth. Such action results in increased gas transfer into solutions and biological systems.

Similarly, as the saturated and super-saturated solutions reach the surface and ambient atmospheric pressure is existent, the gas comes out of solution and will act to strip volatile constituents from the water into gas bubbles. The fine bubbles formed as the pressurized solution moves toward atmospheric pressure acts as dissolved air floatation units by separating non-soluble materials such as petroleum distillates, synthetic oils and greases, naturally-occurring oils and greases and floating such materials upwardly in the form of emulsions or separated layers moved upwardly from the bottom of the installation.

Accordingly, the improved process for 'in situ' treating of contaminated soil environments is simplified and provides an effective, safe, inexpensive and efficient procedure to render contaminated water emitting from waste sites and rubbish dumps to be effectively treated in an expedient manner to achieve all of the enumerated objectives, provides for eliminating difficulties encountered with prior procedures, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention in its various embodiments are by way of example, and the scope of the invention is not limited to the exact details shown or described.

Having now described the features, discoveries and principles of the invention, the manner in which the improved soil treatment process is used and the advantageous new and useful results obtained are set forth in the appended claims.

I claim:

1. The method of 'in situ' collection and treatment of floating, sinking and dissolved contaminants in an underground soil environment comprising the steps of introducing a plurality of tubular members into a contaminated underground soil environment to a depth at least as great as the presence of contaminants affecting ground water pollution, forming a series of in-ground reservoirs at the lower extremities of said tubular members to collect and retain said contaminants therein, and injecting treatment reactants into said in-ground reservoirs through said tubular members to effect chemical reactions with said contaminants for their conversion into non-toxic condition within the underground soil environment.

2. The method in accordance with claim 1, including the step of introducing soil-washing chemicals into the said in-ground reservoirs to effect soil washing and leaching action on said soil environment to extract contaminants from adjacent soil for their treatment and/or removal for treatment.

3. The method in accordance with claim 1, including the step of introducing bacteria, nutrients and air into said reservoirs through said tubular members to effect biological growth of said contaminants for their degradation and conversion into non-toxic condition by bio-remediation.

4. The method in accordance with claim 1, including the step of introducing chemical reactants into said in-ground reservoirs to react with said contaminated in-ground water in said reservoirs for 'in-situ' treatment of said waste water as an underground treatment facility.

5. The method in accordance with claim 1, including the introducing said tubular members in angular relation into an area beneath a leaky tank which has permitted the contamination of the soil environment therebeneath, and treating the said contaminants in said reservoirs to render the same non-toxic and environmentally safe.

6. The method in accordance with claim 1, including the step of injecting soil washing chemicals into the contaminated soil environment in the form of surfactants and metal chelators to effect release and collection of said contaminants.

7. The method in accordance with claim 6, including the step of repeatedly injecting soil washing chemicals into the contaminated soil environment for sequential soil washing and extraction of said contaminants.

8. The method in accordance with claim 2, including the step of utilizing porous pipes as the tubular members for introducing soil-washing chemicals into the contaminated soil environment.

9. The method in accordance with claim 1, including the step of introducing a substantial number of porous tubular members into the contaminated soil environment with relatively close spacing to permit the injection of fluids throughout the soil column.

10. The method in accordance with claim 1, including the step of injecting oxygen into the soil environment through porous tubular members to promote aerobic bacterial growth and allow the proliferation of bacterial species to obtain bio-treatment of the soil environment.

11. The method in accordance with claim 1, including the step of placing a plurality of porous tubular members in inclined relation extending beneath one or more leaky tanks from the surrounding surface periphery to permit extraction and treatment of contaminants.

12. The method in accordance with claim 1, including the step of utilizing lengthy wick-like elements as the said tubular members to permit both injection of chemical reactants and extraction of contaminants into and from said contaminated soil environment.

13. The method of 'in situ' collection and treatment of floating, sinking and dissolved contaminants in an underground soil environment, said method comprising the steps of mounting a plurality of tubular members in the contaminated underground soil environment, said tubular members comprising porous pipe mounted essentially vertically or inclinedly extending into the depth of said contaminants affecting ground water pollution, forming a series of in-ground reservoirs at the lower extremities of a limited number of said tubular members to collect and retain said contaminants thereat, and injecting treatment reactants into said in-ground reservoirs through said tubular members to effect chemical and biological reactions with said contaminants for their conversion into non-toxic environmentally-safe condition within the underground soil environment.

14. The method as defined by claim 13, including the step of downflow injecting soil washing chemicals comprising surfactants and metal chelators.

15. The method as defined by claim 13, including the step of injecting microbes, nutrients for said microbes and air through said tubular members into the contaminated soil environment to effect 'in situ' soil bio-remediation.

16. The method as defined by claim 13, including the step of creating intermittent anaerobic conditions in said contaminated soil environment followed by aerobic treatment to render said contaminants non-toxic and environmentally-safe.

17. The method as defined by claim 13, including the step of injecting remedial gaseous reagents through said tubular members into said contaminated soil environment under increased pressure to enhance the solubility and gaseous transfer of contaminants into aqueous solutions and biological systems for bio-remediation treatment.

18. The method as defined by claim 17, including the step of injecting remedial gaseous reagents in the form of fine bubbles to form pressurized solutions which serve to separate non-soluble materials as emulsions or separated layers for treatment and conversion to non-toxic by-products.

19. The method as defined by claim 18, including the step of floating the said non-soluble materials as emulsions or separated layers upwardly from said in-ground reservoirs through said tubular member for remedial treatment.

* * * * *